United States Patent
Yang et al.

(10) Patent No.: US 7,010,704 B2
(45) Date of Patent: Mar. 7, 2006

(54) APPARATUS FOR DYNAMICALLY ADJUSTING CPU POWER CONSUMPTION

(75) Inventors: Yu-Jen Yang, Taipei (TW); Cheng-Ting Liu, Yung Ho (TW)

(73) Assignee: Quanta Computer Inc., (TW)

( * ) Notice: Subject to any disclaimer, the term of this patent is extended or adjusted under 35 U.S.C. 154(b) by 489 days.

(21) Appl. No.: 10/316,075

(22) Filed: Dec. 11, 2002

(65) Prior Publication Data
US 2004/0049704 A1    Mar. 11, 2004

(30) Foreign Application Priority Data
Sep. 9, 2002   (TW) .............................. 91120519 A

(51) Int. Cl.
G06F 1/26    (2006.01)
G06F 1/32    (2006.01)

(52) U.S. Cl. ...................... 713/300; 713/320; 713/322

(58) Field of Classification Search ................ 713/300, 713/340; 702/132
See application file for complete search history.

(56) References Cited

U.S. PATENT DOCUMENTS

| | | | | |
|---|---|---|---|---|
| 6,014,611 A * | 1/2000 | Arai et al. | ................... | 702/132 |
| 6,367,023 B1 * | 4/2002 | Kling et al. | ................ | 713/340 |

* cited by examiner

*Primary Examiner*—John R. Cottingham
*Assistant Examiner*—Stefan Stoynov

(57) ABSTRACT

An apparatus for dynamically adjusting power consumption of a CPU in a computer system is described. A current flowing through the limiting resistor is detected and whether or not this current is larger than a predetermined current is determined. A warning signal is issued when the current is larger than this predetermined signal. The warning signal triggers the software framework and the hardware framework of the apparatus to issue an asynchronous operation frequency reduction instruction to the CPU of the computer system.

19 Claims, 5 Drawing Sheets

APPARATUS FOR DYNAMICALLY ADJUSTING CPU POWER CONSUMPTION

FIELD OF THE INVENTION

The present invention relates to an apparatus for adjusting the power consumption for a CPU, and more particularly to an apparatus for dynamically adjusting CPU power consumption.

BACKGROUND OF THE INVENTION

When environmental protection is emphasized, the computer industry is required to produce computers that have a reduced environmental impact, such as a green computer. The most standard green computer is a computer that has reduced power consumption.

The notebook PC is the best invention in the recent years. It possesses advantages of a desktop PC, such as a high-speed calculating function and an extensible function. On the other hand, it also possesses advantages not present in a desktop PC, such as a smaller volume and portability. However, a serious problem existing in the notebook PC is that the usage time of the notebook PC is limited because of the battery life. Ordinarily, the notebook PC is connected to an AC outlet when an AC source is available. However, the notebook PC needs to be powered by its battery when there is no AC source. The usage time of the notebook PC is related to the battery life. Typically, there are two methods of increasing usage time for a notebook PC; one is to increase the battery life, but this method also increases the volume and the weight of the battery. The other method is to reduce the power consumption of the CPU in the notebook PC. Such method increases the usage time of the battery life while maintaining the same battery state.

Methods that may be used to control the central processing unit (CPU) are described as follows. The first method is the SpeedStep technology developed for controlling mobile CPUs by Intel. The basic principle of this method is that a mobile CPU runs at a speed virtually identical to that of a desktop system when the notebook computer is connected to an AC outlet. When powered by a battery, the processor drops to a lower operation frequency and voltage, conserving battery life while maintaining a high level of performance. In other words, the mobile CPU runs at different speeds as appropriate for different power sources.

Another method performs a throttling function inside the CPU. In a duty cycle, the operation system can generate a policy to run the processor at less than maximum performance. This policy may run the CPU in accordance with the state of the operation system. The throttling function mechanism provides the operation system with a function of running the CPU at a special percentage of a duty cycle. In other words, the temperature of the CPU may increase if the CPU keeps running at full speed. At this time, the operation system automatically slows down the CPU to reduce the temperature of the CPU. However, the SpeedStep technology developed by Intel does not support desktop CPUs. Furthermore, the throttling function technology permits the operation system to slow down automatically the CPU when the temperature of the CPU exceeds a specified temperature while running. In other words, the main goal of this function is thermal control, not dynamically changing the performance in accordance with the requirements of the system. Dynamically changing the performance in accordance with the requirements of the computer system is therefore difficult.

Use of a desktop CPU in a notebook computer is a valid method of reducing the manufacture cost and increasing performance efficiency. Such application of desktop CPUs in notebook computes is however hindered by the high heat generation and power consumption of the desktop CPU. The SpeedStep technology described above and developed by Intel can be directly controlled by the operation system. This SpeedStep technology permits the operation system to arrange the running schedule of the CPU to reduce the power consumption in accordance with its job condition. However, desktop CPUs developed by Intel do not support this function. A desktop CPU used in a notebook PC may cause high power consumption.

A way of detecting the current and sending a warning signal to the CPU to reduce the frequency of the CPU is therefore required. Such method may reduce not only the notebook computer manufacture cost but also the desktop CPU power consumption.

SUMMARY OF THE INVENTION

In a computer system, the CPU is the most important but also a high power consumption device. This high power consumption obviously affects the notebook PC. For example, it may exhaust the greater part of power supplied by the battery and transfer this exhausted power to heat. The generated heat may increase the temperature of the CPU and the computer system, which is the main reason for computer system instability. This high temperature may cause the computer system to make mistakes. Therefore, a big heat spreader or fan is required to spread heat away from the CPU and reduce the bad effects of the heat. However, the big heat spreader or fan is a burden for the notebook PC.

According to the above descriptions of the prior art, the SpeedStep technology developed by Intel may be directly controlled by the operation system. This operation system may use the SpeedStep technology to arrange the running schedule of the CPU in accordance with its job condition to reduce power consumption. However, the desktop CPU developed by Intel does not support this function. On the other hand, the conventional throttling function technology permits the operation system to slow down automatically the CPU when the temperature of the CPU exceeds a specified temperature while running. In other words, the main goal of this function is thermal control, not dynamically changing the performance in accordance with the requirements of the system. Therefore, the present invention provides an apparatus for dynamically adjusting the speed of the CPU. The present invention dynamically detects the current. A warning signal is sent out to notify the CPU to reduce its operation frequency if the detected current is larger than a predetermined value. Such method resolves the disadvantage of a power consumption increase because of a large current. On the other hand, the present invention also resolves the problem that the CPU does not supply sufficient current for the system when the loading on the CPU is too high. Such high loading may make the CPU unstable and even cause the computer system to shut down.

In accordance with the above description, the main purpose of the present invention is to provide a dynamically adjusting apparatus. This apparatus may dynamically adjust the operation frequency of the CPU in accordance with the operation state of the system. Such dynamic adjustment avoids sudden shut down of this computer system due to high loading.

Another purpose of the present invention is to provide an apparatus for dynamically adjusting the operation frequency of the CPU in accordance with the detected current. Such dynamic adjustment avoids an abrupt high current raising CPU temperature to make the computer system unstable.

A further purpose of the present invention is to provide a method for dynamically adjusting the operation frequency of the CPU. This method not only gives consideration to the work efficiency of the CPU but also prevents an abrupt high current that would raise the CPU temperature.

In accordance with the above purposes, the apparatus for dynamically adjusting the power consumption of a computer system comprises a current sensor, a comparator, an embedded controller, a D-type flip-flop and a frequency generator.

The current sensor detects the current flowing through the limited resistor and sends out a detected signal. The comparator compares the detected signal with a predetermined value to determine whether or not the detected signal is larger than this predetermined value. This predetermined value is set according to the maximum power consumption that the CPU wants to support, which is the maximum loading the CPU wants to process. A warning signal is sent out and triggers the frequency generator and the D-type flip-flop if the detected signal is larger than the predetermined signal. The triggered frequency generator sends a STPCLK# signal to the CPU. This STPCLK# signal may notify the CPU to reduce the operation frequency. On the other hand, the triggered D-type flip-flop may send a latch up signal to the embedded controller to change the set of the SMI value stored inside. Then, the changed SMI value is sent out to the basic input/output system (BIOS). It notifies the chipset to send out a STPCLK# signal to the CPU when the BIOS receives the changed SMI value. Then, this STPCLK# signal notifies the CPU to reduce the operation frequency.

On the other hand, the detected signal sent out by the current sensor also may be sent to the embedded controller. The embedded controller checks the detected signal to determine whether or not the detected signal is less than this predetermined value, thereby determining whether or not the current flowing over the whole system is too large. The embedded controller sends out a reset signal to the D-type flip-flop to reset it if the detected signal is less than this predetermined value. Then, the D-type flip-flop does not send out the latch up signal to the embedded controller again. The SMI value stored in the embedded controller is changed again. The changed SMI value is sent out to the basic input/output system (BIOS). The BIOS notifies the chipset to stop sending the STPCLK# signal to the CPU when the BIOS receives the changed SMI value. Then, the CPU automatically adjusts the operation frequency according to the state of the work.

BRIEF DESCRIPTION OF THE DRAWINGS

The foregoing aspects and many of the attendant advantages of this invention may become more readily appreciated as the same becomes better understood by reference to the following detailed description, when taken in conjunction with the accompanying drawings, wherein.

DETAILED DESCRIPTION OF THE PREFERRED EMBODIMENT

Without limiting the spirit and scope of the present invention, the apparatus for dynamically adjusting the power consumption proposed in the present invention is illustrated with one preferred embodiment. Skilled artisans, upon acknowledging the embodiments, can apply the dynamically adjusting the power consumption apparatus of the present invention to any kind of computer system.

In accordance with the circuit design of the present invention, the problem of power consumption increase arising from an inability to dynamically adjust the CPU apparatus is resolved. This present invention also solves the problem of an insufficient current because of a high loading. The following is a preferred embodiment applying the present invention to a notebook PC; however, the application of the present invention is not limited by the following description.

Typically, the power consumption of the CPU may be reduced by dynamically adjusting the inside operation frequency, which makes the operation frequency of the CPU change according to the CPU loading. The goal of this strategy, in accordance with the present invention, is to reduce the operation frequency of the CPU in time when the CPU loading is too high to avoid the computer system shutting down suddenly. In other words, the dynamic adjustment apparatus of the present invention adjusts the operation frequency in response to changes in the level of the loading. Such adjusting may restrain the operation frequency of the CPU to avoid generating an excessive current. Therefore, the present invention dynamically adjusts the CPU operation frequency according to the level of the loading in the CPU to reduce the power consumption. Moreover, the present invention avoids the computer system shutting down suddenly.

Figure 1:
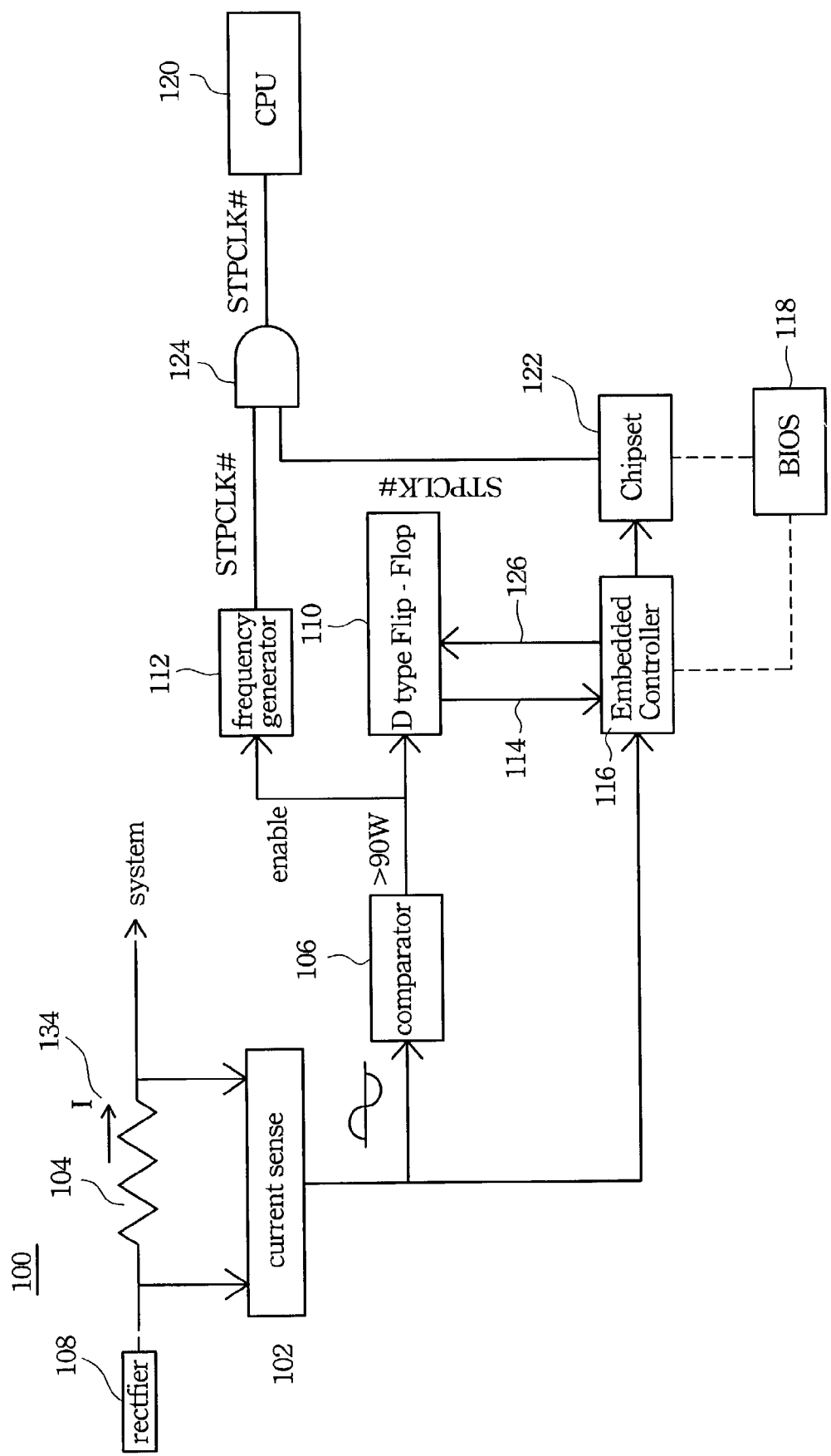
FIG. 1 shows an apparatus for dynamically adjusting the power consumption of a computer system in accordance with the present invention.

FIG. 1 shows a schematic diagram of an apparatus 100 for dynamically adjusting the power consumption of a computer system in accordance with the present invention. The current sensor 102 is used to detect the current 134 flowing through the limited resistor 104. The current sensor 102 amplifies the current 134 and sends out a signal to the comparator 106. The current 134 is sent out from the rectifier 108 and supplies the whole system.

With further reference to FIG. 1, the comparator 106 compares the received signal transferred from the current sensor 102 with a predetermined value (not shown in the figure) to determine whether or not the received signal is larger than this predetermined value. This predetermined value is set according to the maximum power consumption that the CPU wants to support, namely, the maximum loading that the CPU wants to process. The setting method as provided by the prior art is that the user selects one of the two input points of the comparator 106 to input the predetermined value related to the CPU used. The loading that the CPU needs to process consequently exceeds the maximum loading that the CPU may process; namely the current 134 transferred to the system is too large, when the received signal transferred from the current sensor 102 is larger than the predetermined value. At this time, the comparator 106 sends out a warning signal to trigger the frequency generator 112 and the D-type flip-flop 110 both.

On the other hand, when the received signal transferred from the current sensor 102 is less than the predetermined value the loading that the CPU needs to process is less than the maximum loading that the CPU can process. At this time, no warning signal is sent out by the comparator 106. In accordance with the preferred embodiment of the present invention, for example, the predetermined value that the CPU wants to support is set at about 4.7 amperes; namely, the power consumption is set at about 90 watts. The comparator 106 sends out a warning signal when the current sensor 102 detects that the current 134 is larger than the upper limit such as about 4.7 amperes. No warning signal is generated when the current 134 is less than about 4.7 amperes.

Still referring to FIG. 1, the warning signal sent out by the comparator 106 simultaneously triggers both the D-type flip-flop 110 and the frequency generator 112. A STPCLK# signal whose frequency is defined by this frequency generator 112 is sent out when the frequency generator 112 is triggered. The STPCLK# signal is used to command a temporary stop of the operation frequency of the CPU 120. Namely, the relative performance velocity of the CPU 120 is reduced. At this time, the supply voltage of the CPU 120 is also reduced. Such reduction reduces the power consumption of the CPU 120 in real time.

On the other hand, the warning signal sent out by the comparator 106 also may trigger the D-type flip-flop 110. The triggered D-type flip-flop 110 sends a latch up signal 114 to the embedded controller 116 to send out a SMI (System Management Interrupt, SMI) signal. At the same time, the SMI value initially stored in the embedded controller 116 is also changed. The SMI value is used to declare an interrupt event happening in the computer system. Then, the SMI signal is sent out to the basic input/output system 118 (BIOS). It notifies the chipset 122, such as ICH, that there is an interrupt event happening in the computer system when the BIOS 118 detects that the initially SMI set value stored in the embedded controller 116 is changed. Then, the chipset 122 sends out a STPCLK# signal to the CPU 120. This STPCLK# signal is used to notify the CPU 120 to reduce its operation frequency. The power consumption of the CPU 120 is reduced in response to the reduction of the operation frequency. The value of the adjusted operation frequency adjusted by the basic input/output system 118 can be 50%, 60% or 87.5% of the original operation frequency. The basic input/output system 118 is notified that the STPCLK# signals sent out by the frequency generator 112 and the chipset 122 can be transferred to an AND logical gate 124. In other words, the reduction of the operation frequency of the CPU 120 is controlled either by the STPCLK# signal sent from the frequency generator 112 or by the STPCLK# signal sent from the chipset 122.

The performance velocity of the CPU 120 is reduced in response to the reduction of the operation frequency inside the CPU 120. Then, the current 134 flowing through the limited resistor 104 is also reduced. The comparator 106 compares the received signal transferred from the current sensor 102 with a predetermined value (not shown in the figure) to determine whether or not received signal is less than this predetermined value. In accordance with the preferred embodiment of the present invention, no warning signal is sent out from the comparator 106 to trigger the frequency generator 112 if the current 134 is less than about 4.7 amperes. In other words, the frequency generator 112 does not send out the STPCLK# signal to the CPU 120. On the other hand, although the comparator 106 does not send the warning signal to trigger the D-type flip-flop 110, the latch up signal 114 outputted from the D-type flip-flop 110 still controls the embedded controller 116. Therefore, the chipset 122 still controls the CPU 120 to reduce its operation frequency. Namely, the current 134 flowing through the limited resistor 104 is kept under about 4.7 amperes.

On the other hand, the detected signal generated by the current sensor 102 may be sent not only to the comparator 106, but also to the embedded controller 116. Then, the embedded controller 116 checks the detected signal at any time. In accordance with the preferred embodiment of the present invention, the loading that the CPU needs to process is less than the maximum loading that the CPU may process when the detected signal transferred from the current sensor 102 responds that the power consumption is lower than a lower limit such as about 75 watts. The lower limit indicates that the computer system is not busy and the loading of the CPU is lighter, which can be set according to the computer system for removing the operation frequency reduction applied to the CPU. The embedded controller 116 sends out a reset signal 126 to reset the D-type flip-flop 110. Then, the D-type flip-flop 110 stops sending the latch up signal 114 to the embedded controller 116. At this time, the embedded controller 116 changes the SMI value stored inside to declare that the interrupt event has disappeared. The changed SMI value is sent out to the basic input/output system 118 (BIOS). The basic input/output system 118 notifies the chipset 122 that the interrupt event has disappeared when the basic input/output system 118 detects the changed SMI value. Then, the chipset 122 stops sending out the STPCLK# signal to the CPU 120. Therefore, the CPU 120 is able to automatically adjust its operation frequency according to the work that needs to be processed. When the loading in the CPU 120 is too high and causes the current 134 flowing through the limited resistor 104 to be larger than about 4.7 amperes again, the apparatus for dynamically adjusting power consumption of the present invention again starts to reduce the power consumption.

A software framework and a hardware framework are used to send the STPCLK# signal to the CPU 120 to control the operation frequency in the present invention. Such a structure at least has the following advantages. The hardware framework sends the STPCLK# signal to reduce the operation frequency of the CPU 120 in real time when the frequency generator 112 receives the warning signal sent out from the comparator 106. Once the operation frequency of the CPU 120 is reduced, the current 134 flowing through the limited resistor 104 is also reduced. At this time, the frequency generator 112 does not send the STPCLK# signal to the CPU 120 again. However, if a lot of work still needs to be processed at this time, the frequency generator 112 may respond by again increasing the current 134 flowing through the limited resistor 104. This situation makes the comparator 106 again send out the STPCLK# signal to reduce the operation frequency of the CPU 120. Such repeated adjustment of the operation frequency of the CPU 120 may make the computer system unstable. In other words, only using the hardware framework to adjust the operation frequency of the CPU 120 over a short period of time is the main reason for computer system instability.

Therefore, the present invention uses another software framework to adjust the operation frequency of the CPU 120 and thereby avoids the foregoing problem. In other words, the detected signal sent out from the current sensor 102 is transferred not only to the comparator 106 but also to the D-type flip-flop 110. The D-type flip-flop 110 sends out a latch up signal to the embedded controller 116 when receiving the detected signal and the embedded controller 116 changes the set of the SMI value stored inside. Then, the basic input output system 118 commands the chipset to send out a STPCLK# signal to reduce the operation frequency of the CPU when receiving the changed SMI value.

On the other hand, the embedded controller may keep checking whether or not detected signal transferred from the current sensor has responded that the power consumption is less than a predetermined value. A power consumption less than the predetermined value indicates that the computer system is not busy. Therefore, the embedded controller 116 sends out a reset signal 126 to reset the D-type flip-flop 110. Then, the D-type flip-flop stops sending out the latch up signal. At this time, the CPU automatically adjusts its operation frequency in accordance to the work that needs to be processed. When the loading in the CPU 120 is too high and again causes the current 134 flowing through the limited resistor 104 to be larger than about 4.7 amperes, the apparatus for dynamically adjusting power consumption apparatus of the present invention starts again to reduce the power consumption of the CPU 120.

In accordance with the foregoing description, the present invention uses the hardware framework to reduce the operation frequency of the CPU 120 in real time. Next, the software framework is used to keep the operation frequency of the CPU 120 under a specific operation frequency. In other words, the STPCLK# signals respectively sent out from the hardware framework and the software framework are not generated at the same time. The hardware framework first sends out the STPCLK# signal to command the CPU 120 to reduce its operation frequency when the current 134 flowing through the limited resistor 104 is over a predetermined value. Then, the STPCLK# signals generated by the software framework is used to keep the operation frequency of the CPU 120 under a specific value.

Figure 2:
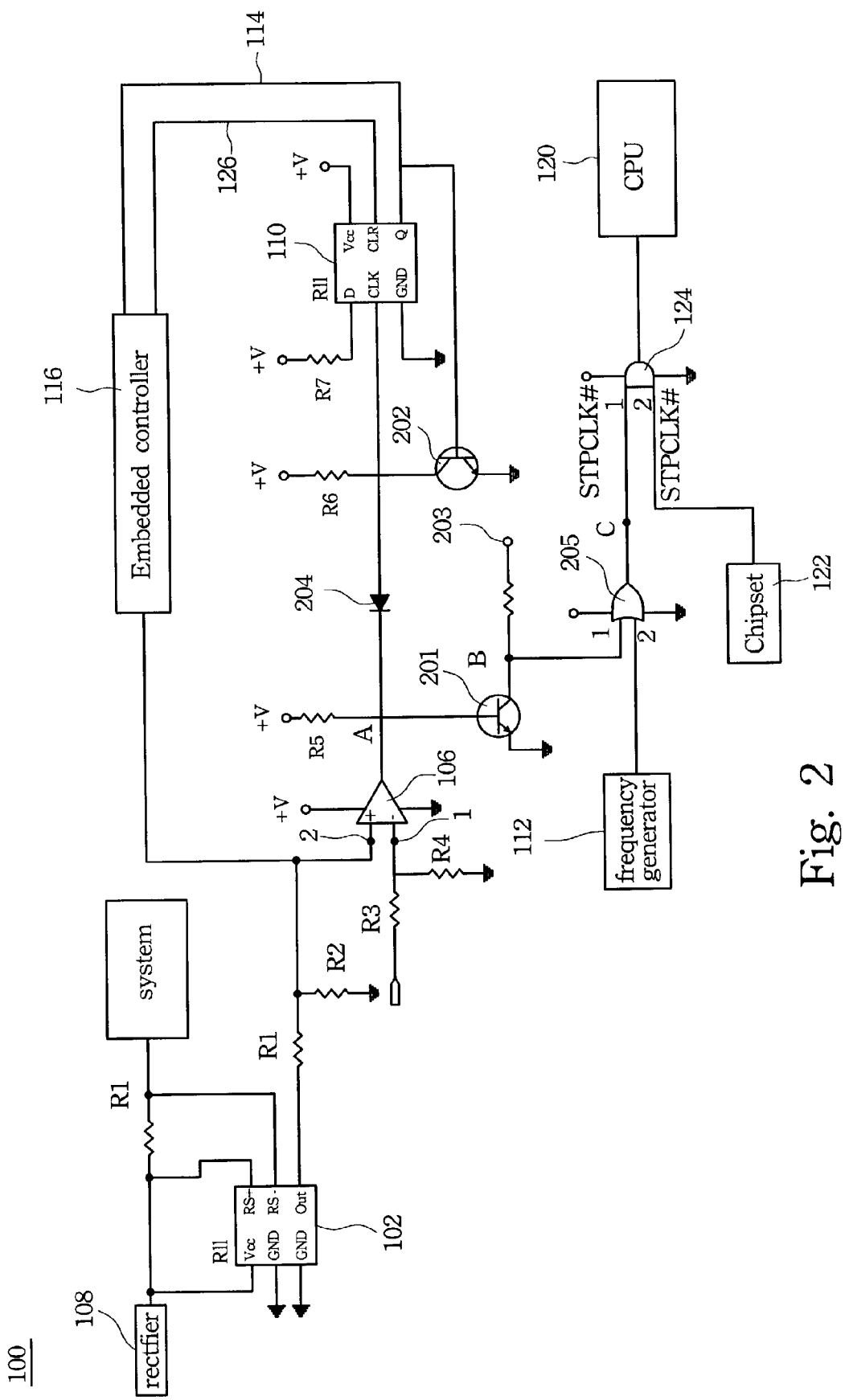
FIG. 2 shows a detailed diagram of the apparatus for dynamically adjusting the power consumption of a computer system according to the present invention.

FIG. 2 shows the apparatus for dynamically adjusting power consumption of the CPU of the present invention in detail. The current sensor 102 has two end points, RS+ and RS−, that respectively receive the current transferred from the rectifier 108 and the current transferred from the resistor R1. The current sensor 102 is used to detect the current flowing through the resistor R1. A detected signal is sent out from the "out" point of the current sensor 102. The detected signal is transferred to the comparator 106 and the embedded controller 116. The current sensor 102 selects the logic circuit, such as MAX4173F produced by the MAXIM company. The current flowing through the resistor R1 supplies the whole system.

The detected signal sent out from the current sensor 102 is transferred to the second end point 2 of the comparator 106. This detected signal is compared with a predetermined value. The predetermined value is input from the first end point 1. The ratio of R3 to R4 is adjusted to obtain the predetermined value in response to the loading that the CPU wants to process. In accordance with the preferred embodiment of the present invention, the predetermined value is set to respond to a 90-watt power consumption of the whole system by adjusting the ratio of R3 to R4. On the other hand, the detected signal may also be transferred to the embedded controller 116. The embedded controller 116 keeps checking the detected signal during operation of the CPU 120.

Figure 3:
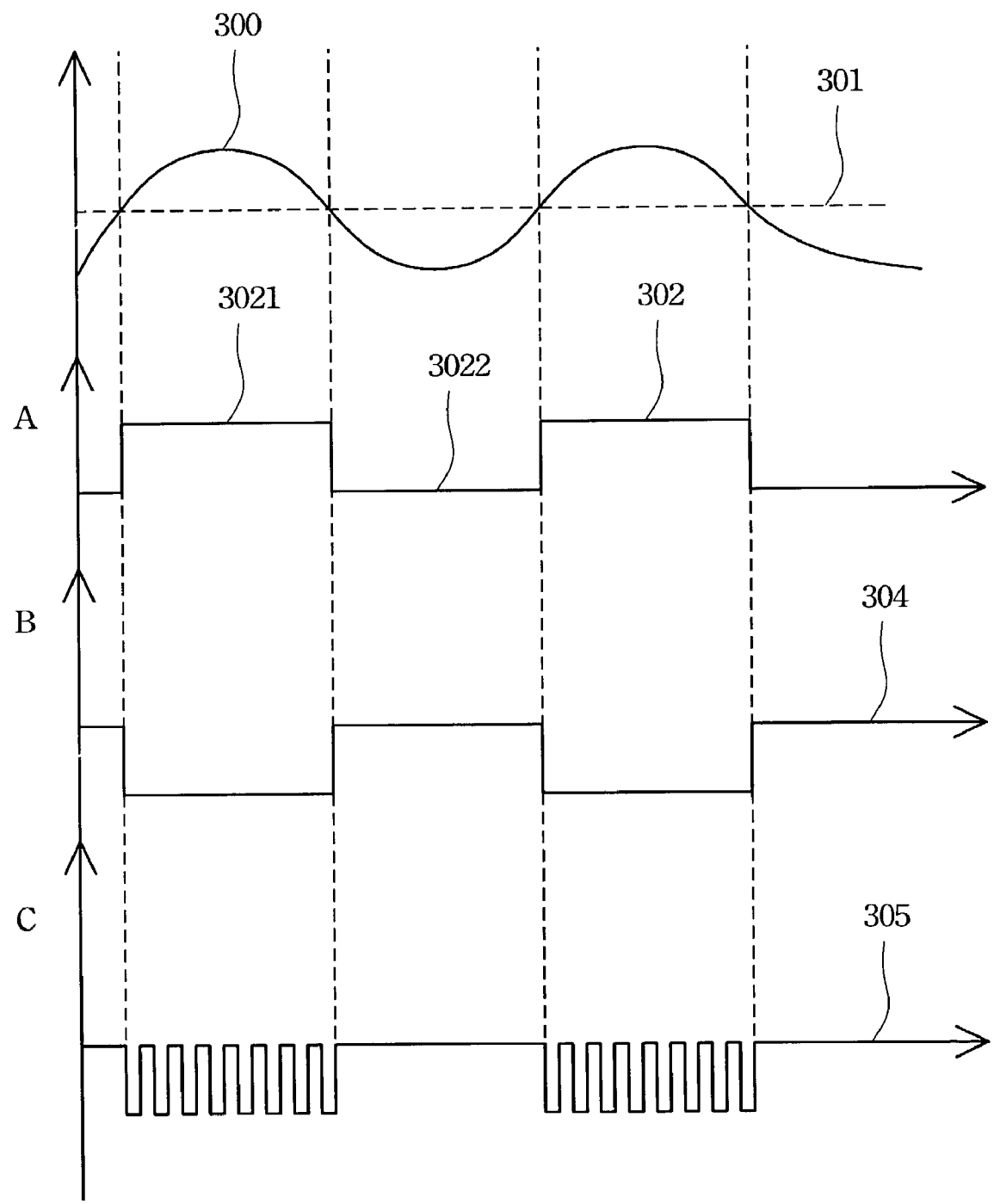
FIG. 3 shows a diagram of the waveform according to the present invention.

Reference is simultaneously made to FIGS. 2 and 3. FIG. 3 shows a waveform diagram. The detected signal transferred from the current sensor 102 is the sine wave signal 300 as shown in FIG. 3. The current flowing through the resistor represents different levels because the levels of the loading in the CPU are different. Therefore, the detected signal transferred from the current sensor 102 displays different levels. The comparator 106 compares the detected signal, the sine wave 300, with a predetermined value 301. The comparator 106 outputs a high level signal 3021 from the output end A when the sine wave 300 is larger than this predetermined value 301. In contrast, the comparator 106 may output a low level signal 3022 from the output end A when the sine wave 300 is less than this predetermined value 301. The high level signal 3021 and the low level signal 3022 form the square signal 302 together as shown in FIG. 3. The high level signal 3021 of the square wave 302 represented by point A may turn on the bipolar junction transistor (BJT) 201. At this time, the voltage source 203 applied to the bipolar junction transistor 201 is coupled to the ground through the bipolar junction transistor 201 to pull down the voltage representing in the point B. Alternately, the low level signal 3022 of the square wave 302 represented by point A may turn off the bipolar junction transistor (BJT) 201. At this time, the voltage source 203 applied to the bipolar junction transistor 201 pulls up the voltage level represented by point B. The voltage waveform represented by point B is a square wave signal 304 as shown in FIG. 3. It is noted that the phase of the square wave signals 302 and 304 respectively represented by points A and B are opposite.

The square wave signal 304 at point B point may be sent to the OR gate 205. The OR gate 205 adds a wave having a special frequency defined by the frequency generator to square wave 304 to form the wave 305 as shown in FIG. 3. In accordance with the preferred embodiment of the present invention, this special frequency defined by the frequency generator is about 4K Hertz. A STPCLK# signal is sent out according to the special frequency to the CPU 120 to reduce its operation frequency.

On the other hand, the square wave 302 represented by point A is transferred to the D-type flip-flop 110 through the transistor 204. The high level signal 3021 of the square wave 302 is transferred to the CLK point of the D-type flip-flop 110 to trigger it. Then, a latch up signal 114 is sent out from the Q point of the D-type flip-flop 110 to the embedded controller 116. The high level signal transferred from the Q end point turns on the transistor 202 and pulls down the electric potential of the CLK point to turn off the diode 204. This turned-off diode 204 isolates the D-type flip-flop 110 from the comparator 106.

It is noticed that the latch up signal 114 transferred from point Q point and the inputted signal at point D are the same when the D-type flip-flop 110 is triggered. In accordance with the preferred embodiment of the present invention, a high electric potential is applied to point D. Therefore, the latch up signal 114 has a high electric potential, too. On the other hand, the latch up signal 114 is changed only if a reset signal 126 is sent to the CLR point of the D-type flip-flop 110. In other words, the embedded controller 116 removes the control only if the embedded controller 116 sends out a reset signal 126 to the D-type flip-flop 110 after the latch up signal 114 transferred from the D-type flip-flop 110 controls the embedded controller 116. Even though a low level signal 3022 as shown in FIG. 3 is sent to the CLK point of the D-type flip-flop 110, the embedded controller 116 is still controlled by the latch up signal 114 except that the embedded controller 116 sends out a reset signal 126 to the D-type flip-flop 110.

Therefore, in accordance with the characteristics described in the foregoing, the embedded controller 116 of the present invention keeps detecting the detected signal transferred from the OUT point of the current sensor 102. A reset signal 126 is sent out from the embedded controller 116 to reset the D-type flip-flop 110 when the detected signal is less than a predetermined value. Then, the D-type flip-flop 110 stops transferring the latch up signal 114 to the embedded controller 116. In other words, the embedded controller 116 removes control of the latch up signal 114. The D-type flip-flop 110 can be, for example a logic circuit NC7SZ175, produced by the Fairchild company.

Reference is again made to FIG. 2. The triggered D-type flip-flop 110 sends a latch up signal 114 to the embedded controller 116. Then, a SMI signal is sent out from the embedded controller 116 when it is controlled by the latch up signal 114. At the same time, the SMI value initially stored in the embedded controller 116 is also changed. The SMI value is used to declare an interrupt event happening in the computer system. Then, the SMI signal is sent out to the basic input/output system 118 (BIOS). The SMI signal notifies the chipset 122 that there is an interrupt event happening in the computer system when the BIOS 118 detects that the initially SMI set value stored in the embedded controller 116 is changed. Then, the chipset 122 sends out a STPCLK# signal to the CPU 120. This STPCLK# signal is used to notify the CPU 120 to reduce its operation frequency. The power consumption of the CPU 120 is reduced in response to the reduction of the operation frequency. The value of the adjusted operation frequency adjusted by the basic input/output system 118 can be about 50%, 60% or 87.5% of the original operation frequency.

On the other hand, the embedded controller 116 may check the detected signal transferred from the current sensor 102 at any time. In accordance with the preferred embodiment of the present invention, the loading that the CPU 120 needs to process is consequently less than the maximum loading that the CPU 120 can process when the detected signal transferred from the current sensor 102 responds that the power consumption is lower than the lower limit such as about 75 watts. Therefore, the embedded controller 116 sends out a reset signal 126 to reset the D-type flip-flop 110. Then, the D-type flip-flop 110 stops sending the latch up signal 114 to the embedded controller 116. At this time, the embedded controller 116 changes the SMI value stored inside and declares that the interrupt event has disappeared. The changed SMI value is sent out to the basic input/output system 118 (BIOS). The basic input/output system 118 notifies the chipset 122 that the interrupt event has disappeared when the basic input/output system 118 detects the changed SMI value. Then, the chipset 122 stops sending out the STPCLK# signal to the CPU 120. Therefore, the CPU 120 automatically adjusts its operation frequency according to the work that needs to be process. When the loading in the CPU 120 is too high and again causes the current 134 flowing through the limited resistor 104 to be larger than the upper limit such as about 4.7 amperes, the apparatus for dynamically adjusting power consumption of the present invention again starts to reduce the power consumption.

Figure 4:
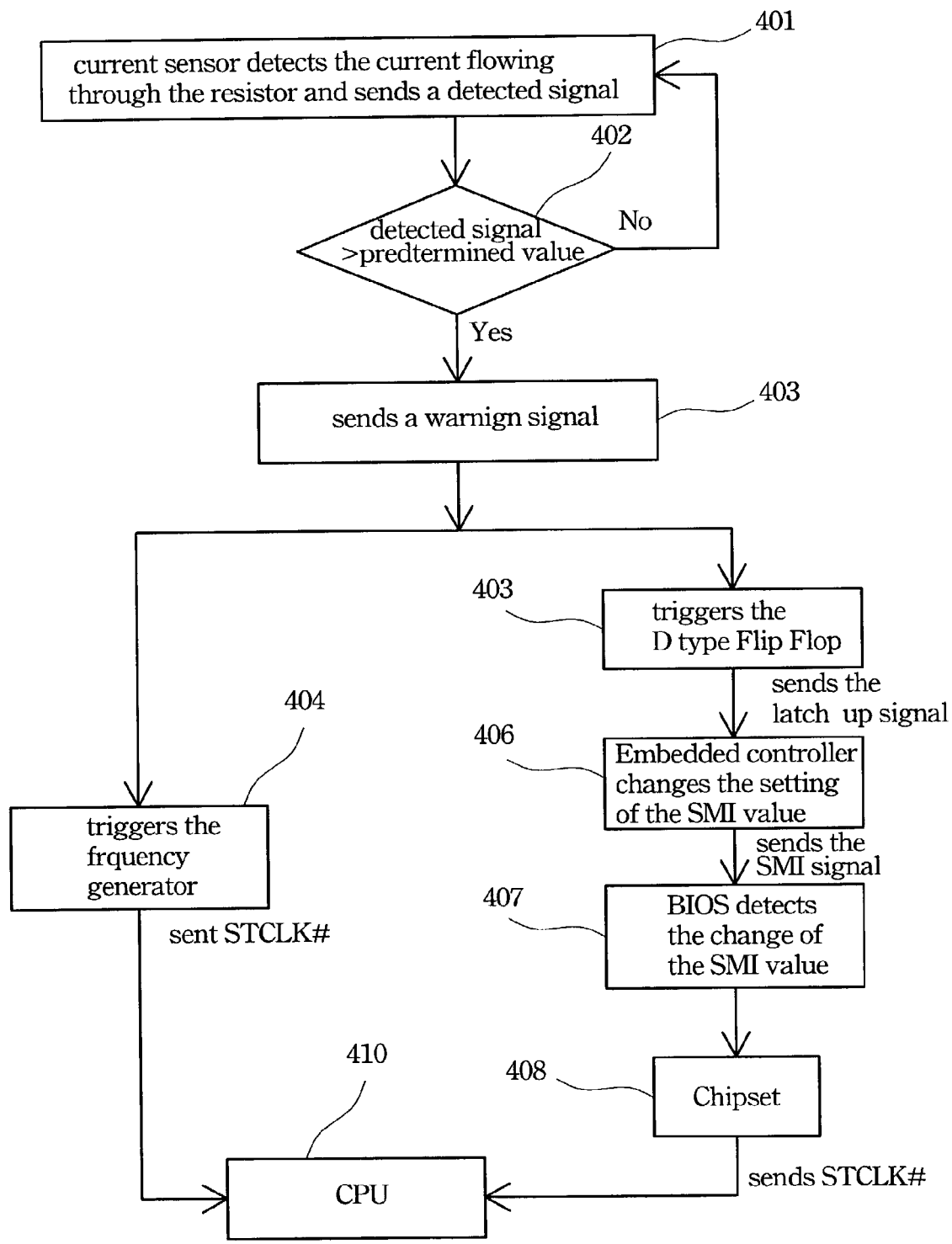
FIG. 4 shows a flow chart for dynamically adjusting the CPU to reduce its operation frequency according to the present invention.

FIG. 4 shows a flow chart for dynamically adjusting the CPU to reduce its operation frequency according to the present invention. In step 401, the current sensor detects the current flowing through the resistor and sends out a detected signal. In step 402, a comparator is used to compare the detected signal with a predetermined value to determine whether or not the detected signal is larger than this predetermined value. This predetermined value is set according to the maximum power consumption that the CPU wants to support, or the maximum loading the CPU wants to process. If the detected signal is less than the predetermined value, the flow chart returns to step 401 to detect again the current flowing through the resistor. Otherwise, a warning signal is sent out in step 403. The warning signal simultaneously triggers the frequency generator and the D-type flip-flop in step 404 and step 405. The frequency generator is triggered in step 404 and generate a STPCLK# signal. This STPCLK# signal is sent to the CPU in step 410. This STPCLK# signal notifies the CPU to reduce its operation frequency. On the other hand, the warning signal generated in step 403 may trigger the D-type flip-flop in step 405. The D-type flip-flop sends a latch up signal to the embedded controller. In step 406, the latch up signal changes the set of SMI values stored in the embedded controller and the embedded controller sends out a SMI signal. In step 407, when the basic input/output system receives the SMI signal, it notifies the chipset, such as ICH, to send out a STPCLK# signal to the CPU in step 408. This STPCLK# signal controls the CPU to reduce the operation frequency. The value of the adjusted operation frequency adjusted by the basic input/output system 118 is about 50%, 60% or 87.5% of the original operation frequency.

Figure 5:
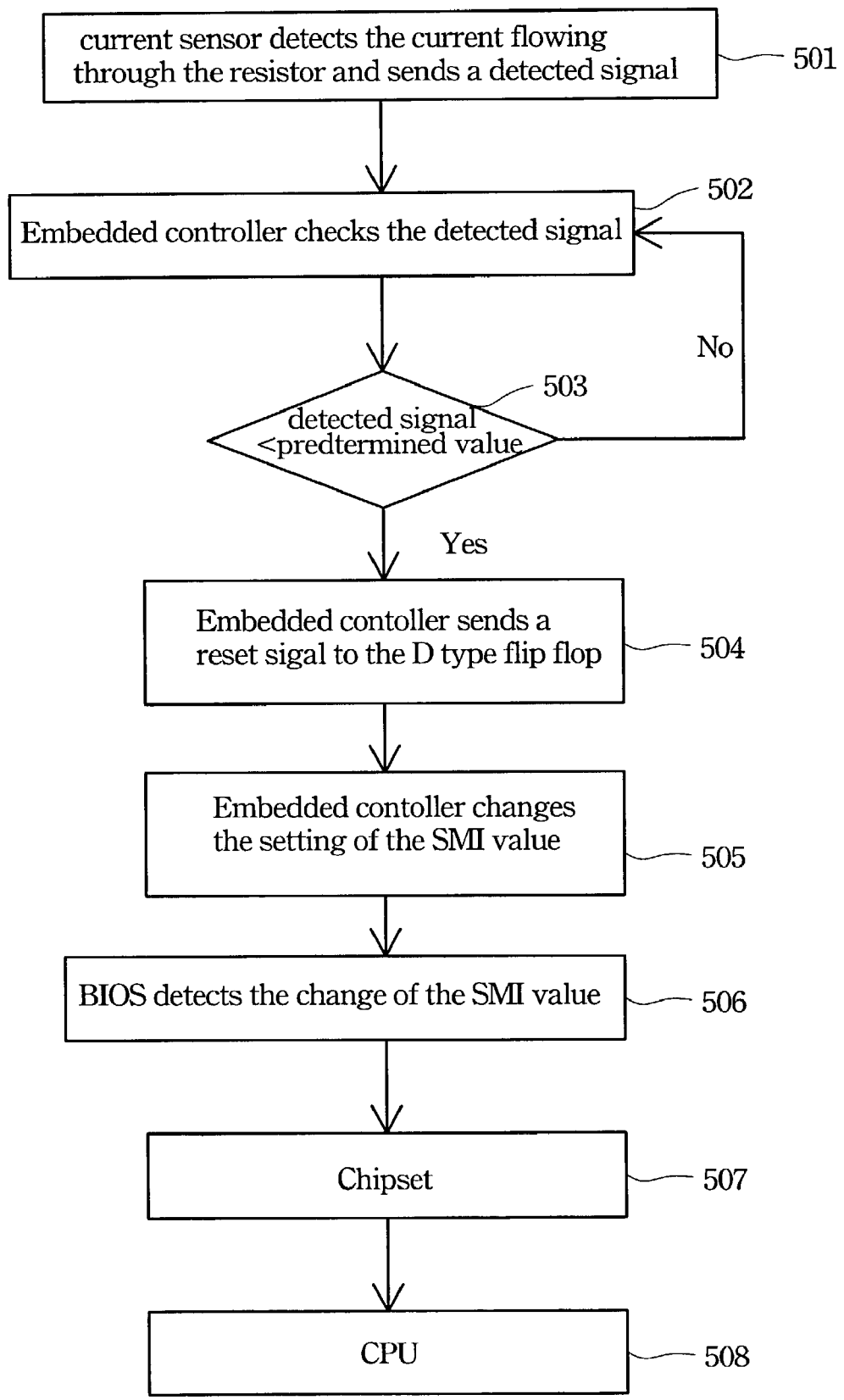
FIG. 5 shows a flow chart of the apparatus for dynamically adjusting the power consumption stopping sending out the STPCLK# signal according to the present invention.

FIG. 5 shows a flow chart of the apparatus for dynamically adjusting the power consumption stopping sending out the STPCLK# signal according to the present invention. In step 501, the current sensor detects the current flowing through the resistor and sends out a detected signal to the embedded controller. In step 502, the embedded controller checks the detected signal and in step 503 determines whether or not the detected signal is less than this predetermined value, such as the lower limit of power consumption, to determine whether or not current flowing through the whole system is too large. A detected signal less than this predetermined value indicates that the CPU is not busy. Therefore, in step 504, the embedded controller may send out a reset signal to the D-type flip-flop to reset the same. Then, the D-type flip-flop does not again send out the latch up signal to the embedded controller. In step 505, the embedded controller changes the SMI value stored inside and sends out a SMI signal. When the basic input/output system detects the SMI signal in step 506, the BIOS notifies the chipset to stop sending out the STPCLK# signal to the CPU as shown in step 507 and step 508. Then, the CPU automatically adjusts the operation frequency according to the state of the work.

As is understood by a person skilled in the art, the foregoing preferred embodiment of the present invention is illustrative rather than limiting of the present invention. It is intended to cover various modifications and similar arrangements included within the spirit and scope of the appended claims, the scope of which should be accorded the broadest interpretation so as to encompass all such modifications and similar structure.

While the preferred embodiment of the invention has been illustrated and described, it may be appreciated that various changes can be made therein without departing from the spirit and scope of the invention.

What is claimed is:

1. An apparatus for dynamically adjusting power consumption of a CPU in a computer system, wherein a basic input/output system and a chipset exist in said computer system and a current flowing through a limited resistor is used to supply needs of an entire computer system, and a detected signal related to said current is generated, said apparatus comprising:

a comparator for comparing said detected signal with a first predetermined value, wherein if said detected signal is larger than said first predetermined value, a warning signal is generated;

a hardware framework, wherein said warning signal triggers said hardware framework to generate and send an operation frequency reduction instruction having a special frequency to said CPU;

a D-type flip-flop, wherein said D-type flip-flop is triggered by said warning signal and generates a latch up signal; and an embedded controller for receiving said latch up signal, wherein said latch up signal controls said embedded controller to perform a first rewriting process to change the set value stored in said embedded controller and said embedded controller generates and sends a first signal to the basic input/output system of said computer system to command the chipset to send said operation frequency reduction instruction to said CPU to reduce the operation frequency thereof according to said first rewriting process, and said embedded controller continues detecting said detected signal and compares said detected signal with a second predetermined value, and if said detected signal is less than said second predetermined value, said embedded controller sends a reset signal to said D-type flip-flop to remove said latch up signal and a second rewriting process is performed to change the set value stored in said embedded controller, and said embedded controller generates and sends a second signal to the basic input/output system of said computer system to command the chipset to remove said operation frequency reduction instruction applied to said CPU according to said second rewriting process.

2. The apparatus for dynamically adjusting power consumption according to claim 1, wherein said hardware framework comprises a frequency generator, and said frequency generator is triggered by said warning signal and generates said operation frequency reduction instruction to said CPU according to a frequency defined by said frequency generator.

3. The apparatus for dynamically adjusting power consumption according to claim 1, wherein said first signal and said second signal are SMI signals.

4. The apparatus for dynamically adjusting power consumption according to claim 1, wherein said first predetermined value is set according to a maximum power consumption supported by the CPU, namely, a maximum loading the CPU wants to process.

5. The apparatus for dynamically adjusting power consumption according to claim 1, wherein said second predetermined value is set according to the computer system for removing the operation frequency reduction instruction applied to the CPU.

6. The apparatus for dynamically adjusting power consumption according to claim 1, wherein said operation frequency reduction instruction is STPCLK#.

7. An apparatus for dynamically adjusting power consumption of a CPU in a computer system, wherein a basic input/output system and a chipset exist in said computer system and a current flowing through a limited resistor is used to supply needs of an entire computer system, said apparatus comprising:

a current sensor for detecting said current and generating a detected signal;

a comparator for comparing said detected signal with a first predetermined value, wherein if said detected signal is larger than said first predetermined value, a warning signal is generated;

a frequency generator, wherein said frequency generator is triggered by said warning signal and generates and sends an operation frequency reduction instruction to said CPU according to a frequency defined by said frequency generator;

a D-type flip-flop, wherein said D-type flip-flop is triggered by said warning signal and generates a latch up signal; and an embedded controller for receiving said latch up signal, wherein said latch up signal commands said embedded controller to perform a first rewriting process to change the a set value stored in said embedded controller and said embedded controller generates and sends a first signal to the basic input and output system to command the chipset to send an operation frequency reduction instruction to said CPU to reduce an operation frequency thereof according to said first rewriting process, and said embedded controller keeps detecting said detected signal and compares said detected signal with a second predetermined value, wherein if said detected signal is less than said second predetermined value, said embedded controller sends a reset signal to said D-type flip-flop to remove said latch up signal, a second rewriting process is performed to change the set value stored in said embedded controller, and said embedded controller generates and sends a second signal to the basic input/output system to command the chipset to remove said operation frequency reduction instruction applied to said CPU according to said second rewriting process.

8. The apparatus for dynamically adjusting power consumption according to claim 7, wherein said first signal and said second signal are SMI signals.

9. The apparatus for dynamically adjusting power consumption according to claim 7, wherein said first predetermined value is about 90 watts.

10. The apparatus for dynamically adjusting power consumption according to claim 7, wherein said second predetermined value is about 75 watts.

11. The apparatus for dynamically adjusting power consumption according to claim 7, wherein said operation frequency reduction instruction is STPCLK#.

12. A method of dynamically adjusting the power consumption for a CPU in a computer system, wherein a basic input/output system and a chipset exist in said computer system and a current flowing through a limited resistor is used to supply needs of an entire computer system, said method comprising:

detecting said current and generating a detected signal;

comparing said detected signal with a first predetermined value, wherein if said detected signal is larger than said first predetermined value a warning signal is generated;

using said warning signal to trigger said frequency generator and generating an operation frequency reduction instruction to said CPU;

using said warning signal to trigger said D-type flip-flop and generate a latch up signal; and using said latch up signal to control an embedded controller, wherein said embedded controller performs a first rewriting process to change a set value stored therein, said embedded controller generates a first signal to the basic input and output system to command the chipset to send an operation frequency reduction instruction to said CPU to reduce an operation frequency thereof according to said first rewriting process, and said embedded controller continues to detect said detected signal and compare said detected signal with a second predetermined value, wherein if said detected signal is less than said second predetermined value, said embedded controller sends a reset signal to said D-type flip-flop to remove said latch up signal and a second rewriting process is performed to change set value stored in said embedded controller, and said embedded controller generates a second signal to the basic input/output system to command the chipset to remove said operation frequency reduction instruction applied to said CPU according to said second rewriting process.

13. The method of dynamically adjusting power consumption according to claim 12, wherein said first signal and said second signal are SMI signals.

14. The method of dynamically adjusting power consumption according to claim 12, wherein said first predetermined value is set according to a maximum power consumption supported by the CPU, namely, a maximum loading the CPU wants to process.

15. The method of dynamically adjusting power consumption according to claim 12, wherein said first predetermined value is about 90 watts.

16. The method of dynamically adjusting power consumption according to claim 12, wherein said second predetermined value is set according to the computer system for removing the operation frequency reduction instruction applied to the CPU.

17. The method of dynamically adjusting power consumption according to claim 12, wherein said second predetermined value is about 75 watts.

18. The method of dynamically adjusting power consumption according to claim 12, wherein said work frequency reduction instruction is STPCLK#.

19. The method of dynamically adjusting power consumption according to claim 12, wherein said basic input and output system commands the chipset to send said operation frequency reduction instruction to said CPU to reduce the operation frequency thereof to about 50%, 60% or 87.5% of an original operation frequency of the CPU.

* * * * *